Jan. 19, 1960

T. E. BELSHAW 2,921,541

MACHINE FOR FORMING FRENCH DOUGHNUTS

Filed Dec. 31, 1957

INVENTOR.
Thomas E. Belshaw
BY Barnes & Seed
attys.

Jan. 19, 1960     T. E. BELSHAW     2,921,541
MACHINE FOR FORMING FRENCH DOUGHNUTS

Filed Dec. 31, 1957     2 Sheets-Sheet 2

INVENTOR.
Thomas E. Belshaw
BY Barnes & Seed
attys.

United States Patent Office 2,921,541
Patented Jan. 19, 1960

2,921,541
MACHINE FOR FORMING FRENCH DOUGHNUTS

Thomas E. Belshaw, Seattle, Wash.

Application December 31, 1957, Serial No. 706,530

9 Claims. (Cl. 107—14)

The present invention relates to an improved dough former for forming fancy pastry such as a "French doughnut" or "cruller" which has a spirally developed rib effect.

More particularly, the invention concerns dough formers of the general type shown in U.S. Patent No. 2,637,282, and aims to provide such a machine which will extrude French doughnuts without loss of the numerous advantages which the machine otherwise possesses.

With yet additional objects and advantages in view which, with the foregoing, will appear and be understood in the course of the following description and claims, the invention consists in the novel construction and in the adaptation and combination of parts hereinafter described and claimed.

Figure 1:
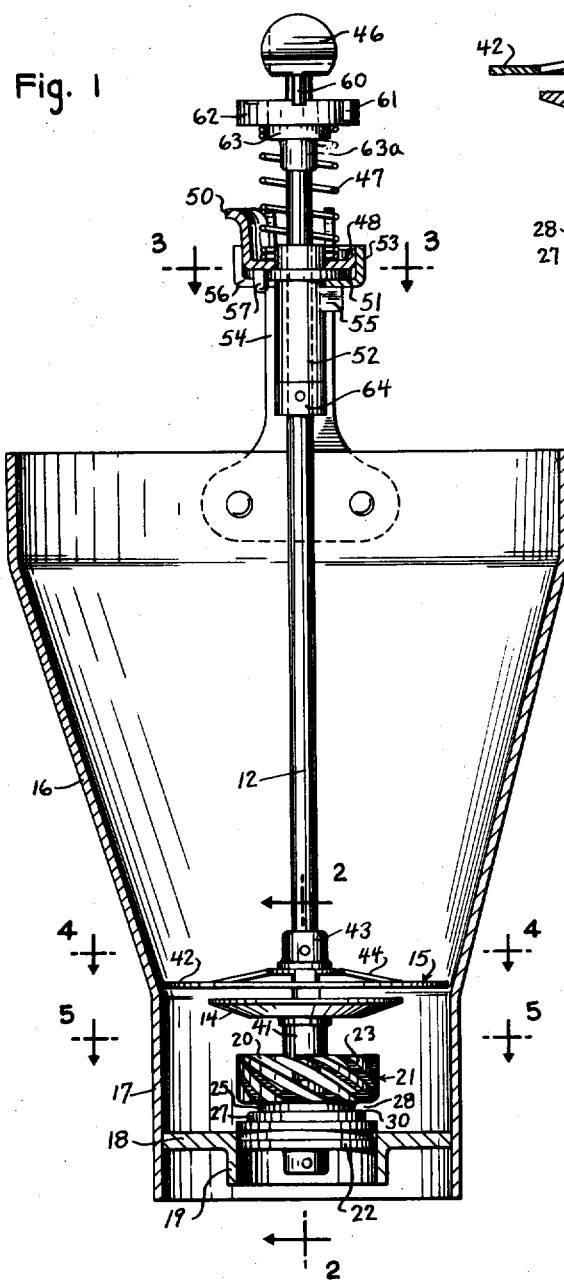
Figure 1 is a view of my dough former primarily in longitudinal vertical section and partly in elevation.
Figure 2:
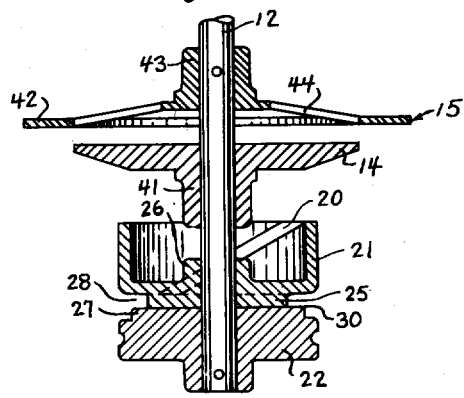
Fig. 2 is a vertical sectional view taken as indicated by the line 2—2 of Fig. 1, and with only one of the orifices being shown for clarity.
Figure 3:
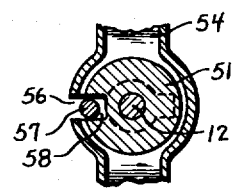
Figs. 3–5 are horizontal sectional views taken along the lines 3—3, 4—4, and 5—5, respectively of Fig. 1.
Figure 4:
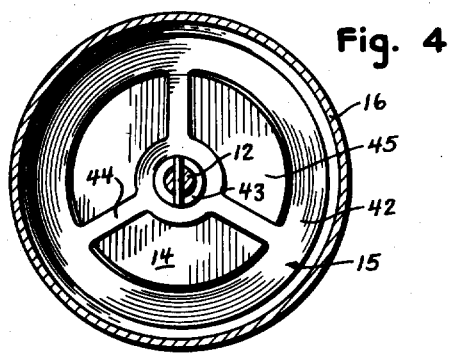
Figure 5:
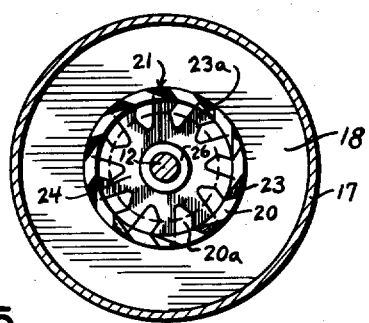

As before mentioned, my invention is directed to a device having several features in common with the dough former of Patent No. 2,637,282, and namely one in which a dough hopper 16 has a valve chamber 17 at its lower end into which dough from the hopper is metered by a check valve unit 14—15 carried by a reciprocating rod 12, the metered dough then being expelled through a discharge tube 19 projecting from an annular plate 18 fitted into the lower end of the valve chamber. In the present invention the dough, during expulsion from the discharge tube, extrudes through a plurality of spirally developed slots or orifices 20 cut in parallel spaced relation around a hollow die cylinder 21 which surmounts a forming piston 22 pinned or otherwise secured at the lower end of the rod 12. The sloping fingers or teeth 23 between the orifices 20 emit by lower root portions 23a from the rim of a hub plate 24. It should be noted that this hub plate is radially grooved inwardly of the die cylinder proper to provide bottom ports 20a located between the roots of the teeth 23 and merging with respect to the orifices 20. Inwardly of the ports 20a the hub plate 24 is formed with a downward spacing extension 25 and may have an upstanding boss 26. This extension 25 rests upon a neck 27 provided at the top of the forming piston to the end that the die cylinder and forming piston are separated by a peripherally exposed groove or chamber 28 which is stepped at a shoulder 30 spaced below the ports 20a through which dough to the chamber is fed as will hereinafter be explained. The die cylinder and piston have been shown as separate parts for ease of manufacture, but it is understood that they could be one-piece construction or on the other hand, that the extension 25 and the neck 27 could be provided in the form of one or more spacing washers.

Directing attention to the check valve unit 14—15 it is seen that such comprises a component 15 of wheel-like configuration rigidly secured to the rod 12 and a disc-like component 14 floating on the rod and supported by a hub 41 between component 15 and forming cylinder 21. The outer diameter of the rim 42 of the wheel-like component corresponds to the inside diameter of the valve chamber 17 and the outer diameter of the floating component approximates the inside diameter of the rim 42. Extending spokes 44 providing sectorial openings 45 therebetween. The hub 43 is secured to the rod 12 and it will be noted that the length of the hub 41 below the floating component is such that the latter is always spaced above the plate 18 and even when the forming cylinder and piston are at their lowest limit of travel.

As in Patent No. 2,637,282 the rod 12 has a handle 46 at its upper end and is yieldingly urged upwardly by a spring 47 which is seated at its lower end in a cupped lock ring 48. This lock ring has a handle 50 and engages a circular flange 51 provided near the upper end of a sleeve 52 through which the rod 12 is journaled for reciprocating endwise movement. The flange 51 in turn rests upon a downwardly dished seat 53 formed at the center of a bail 54 which is riveted at its ends to the rim of the hopper. It will be seen that sleeve 52 is formed with a lug 55 spaced below the flange 51 a distance slightly greater than the thickness of the bail seat 53. A center opening is provided in the latter for receiving the sleeve 52 and is intersected by a slot 56 formed in the bail for receiving a locking finger 57 depending from the lock ring 48 and passing through a slot 58 in the flange 51. It will be noted that the slot 56 must be wide enough to permit passage therethrough of the rod 12 and the lug 55 during assembly of the device.

The handle 46, as in my copending application Ser. No. 480,429, filed January 7, 1955, now Patent No. 2,828,700 dated April 1, 1958, has a depending pin 60 for selectively nesting in radial grooves 61 provided by a dial 62 which is free to turn relative to the rod 12. These grooves 61 are evenly spaced about the periphery of the dial and are of progressively varying depths. Seated within the dial 62 is an upper spring seat 63 which is sleeved on the rod 12 and is stepped to provide a depending boss 63a. This boss is encircled by the spring 47 and serves as a stop to engage the upper end of the sleeve 52 before the spring reaches a fully compressed condition. Upward movement of rod 12 with respect to the hopper due to action of the spring is limited by a collar 64 which bears against the lower end of sleeve 52 when the rod is at its upper limit of travel. This collar can be permanently pinned in position on the rod or can be adjustably mounted by use of a set screw.

Figure 6:
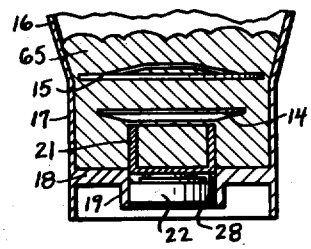
Figs. 6–11 illustrate schematically the relative positions of the forming piston, die cylinder, and the components of the check valve during the forming of a French doughnut.

The operation of the device in forming a French doughnut is shown schematically in Figs. 6 to 11, inclusive. Fig. 6 shows the hopper 16 and the valve chamber 17 full of dough 65, and the valve components 14, 15, die cylinder 21 and forming piston 22 in their upper, or raised, position. It should be kept in mind that the piston 22 and valve component 15 are held in position by being secured to the rod 12, and the floating valve component 14, loosely sliding on the rod 12, is held in its normal position by the underlying die cylinder 21, and more specifically by the upstanding boss 26 of the latter.

Figure 7:
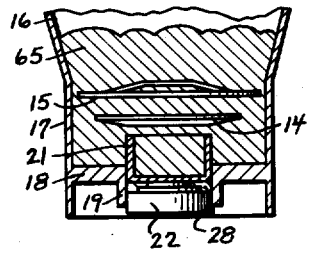
Figure 8:
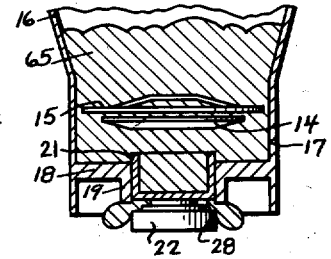
Figure 9:
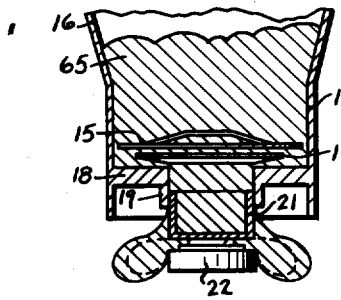
Figure 10:
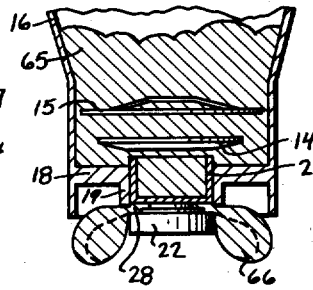

As the rod 12 carries the valve component 15 and the die cylinder and forming piston downward, as in Fig. 7, the rod will slide through the hub 41 of the floating valve component 14, dough will be pulled into the discharge tube 19 and the downwardly moving valve component 15 will engage the floating component 14 so that the check valve will substantially isolate the hopper 16, as in Fig. 8. By this time the annular chamber 28 directly above the forming piston 22 will normally be filled with dough which has entered therein through the ports 20a. At the point of closure of the check valve 14—15, the forming piston will leave the discharge tube 19 thereby commencing the outward exposure of the chamber 28. Further downward movement will extrude additional dough through the ports 20a causing an enlargement of the dough core-ring which is defined by the chamber 28 (see Fig. 8). During such and subsequent enlargement the shoulder 30 helps to keep the core-ring from expanding its inside diameter such as to slip over the forming piston. As the rod 12 continues its down stroke the forming cylinder will begin to leave the discharge tube thereby commencing the exposure of the orifices 20 for extrusion of dough outwardly therethrough. This orifice-extruded dough flows downwardly over the core-ring and starts the formation thereon of spiral ribs, one from each orifice. Since the lower portion of the orifices 20 is exposed longest for extrusion therethrough, the lower portions of the ribs being formed on the core-ring become correspondingly thicker in the radial direction. Also, the slope of each orifice causes the dough which flows from the upper portion thereof to be displaced circumferentially of the core-ring from the start of the respective rib. In this regard it has been found that an orifice slope of about 30 degrees gives approximately a 45 degree slope to the ribs. At the bottom of the down or ejection stroke (Fig. 9) an upper portion of the die cylinder 21 still remains in the discharge tube 19.

Figure 11:
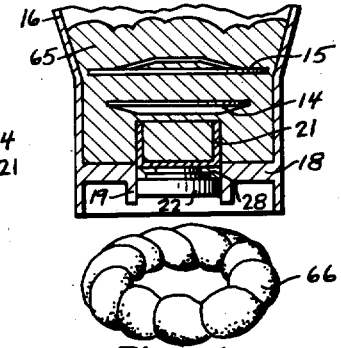

Then, upon release of the handle 46, the compressed spring 47 urges the rod 12 upwardly in a return stroke. During this stroke the forming piston 22 enters the discharge tube 19 and the doughnut 66 is cut off, as in Fig. 10, and the valve component 15 leaves the floating component. Further upward movement brings the boss 26 against the under side of the hub 41 of the floating component and raises the latter. During this upward movement dough is drawn from the hopper 16 and through the valve openings 45 into the valve chamber 17. The upward movement of the rod 12 and its associated parts is limited by the collar 64 bearing against the sleeve 52 which is locked in the bail 54. The device in this position, Fig. 11, is then ready for another cycle.

It is thought that the invention will have been clearly understood from the foregoing detailed description. Changes within the spirit of my teachings may be resorted to without departing from the invention and it is accordingly my intention that the hereto annexed claims be given a scope in their construction fully commensurate with the broadest interpretation to which the employed language admits.

What I claim, is:

1. In a dough former, a rod, a tubular die open at one end and having a hub at the other end rigidly mounted on said rod, and a piston rigidly mounted on said rod and spaced by an outwardly opening annular chamber from said hub, said chamber being stepped into two radial depths by an annular shoulder on said piston which is spaced from said hub, said hub having ports connecting the interior of said die with the deeper part of said chamber, the walls of said chamber being otherwise uninterrupted, and said die having a plurality of parallel dough extruding slots therethrough sloping from said hub toward said open end of the die.

2. In a dough former, a hopper providing a valve chamber having an inlet and outlet, a rod extending endwise through the hopper and valve chamber, a piston on the rod for opening and closing the outlet, a tubular die open to said valve chamber and carried by said rod, said die being spaced from the piston by an outwardly exposed annular chamber and having a plurality of spirally developed parallel orifices open at one end to said annular chamber and extending radially through the die, a check valve in said valve chamber, including as complementing parts a valve and valve seat, one of these parts being secured to the rod, the other of these parts floating between said die and said secured part, and means for reciprocating said rod endwise between an outlet closing position, whereat said piston closes the outlet, and an outlet opening position, whereat said piston and part of the length of said die extend from said outlet, whereby the check valve automatically closes sufficiently during each outlet opening stroke to isolate a charge of dough and progressively extrude the same through said annular chamber and orifices as they are progressively outwardly exposed below the outlet, and whereby the piston cuts off the extruded dough and the check valve automatically opens during each outlet closing stroke to replenish the foregoing extruded charge of dough from the hopper.

3. The dough former of claim 2 in which said annular chamber is stepped into multiple depths with the deepest part thereof adjoining said die.

4. The dough former of claim 2 in which said orifices occupy different sectors of the die.

5. The dough former of claim 2 in which said orifices extend the full length of said die.

6. In a dough former, a discharge tube having an outlet end, a rod extending endwise through said tube, a dough-hole forming member rigidly mounted on the rod and adapted to close said outlet, a tubular die rigidly mounted on said rod and spaced toward said discharge tube from said member by an outwardly exposed annular chamber, said die being movable with said rod endwise through said discharge tube and having a plurality of spirally developed parallel dough-extruding slots open at one end to said chamber and extending radially through the die, said slots each spiralling circumferentially well beyond the chamber end of the preceding slot, means for reciprocating said rod endwise relative to said discharge tube between an outlet closing position, whereat said member closes the outlet, and an outlet opening position whereat said member and part of the length of said die extend from said outlet, and means for supplying dough under pressure to said die during each outlet opening stroke.

7. In a dough former, a discharge tube having an outlet end, a rod extending endwise through said tube, a dough-hole forming member rigidly mounted on the rod and adapted to close said outlet, a tubular die rigidly mounted by a hub on said rod and movable therewith endwise through said discharge tube, said hub being spaced toward said discharge tube from said member by an outwardly exposed annular chamber and having dough-extruding ports connecting the interior of said die with said chamber, said die having a plurality of spirally developed parallel dough-extruding slots open at one end to said chamber and extending radially through the die, said slots each spiralling circumferentially well beyond the chamber end of the preceding slot, means for reciprocating said rod endwise relative to said discharge tube between an outlet closing position, whereat said member closes the outlet, and an outlet opening position whereat said member and part of the length of said die extend from said outlet, and means for supplying dough under pressure to said die during each outlet opening stroke.

8. The dough former of claim 7 in which said ports are extensions of said slots.

9. In a dough former, a discharge tube having an outlet end, a rod extending endwise through said tube, a dough-hole forming member rigidly mounted on the rod and adapted to close said outlet, a tubular die rigidly mounted by a hub on said rod and movable therewith endwise through said discharge tube, said hub being spaced toward said discharge tube from said member by an outwardly exposed annular chamber which is stepped into two radial depths the deeper of which adjoins said die, the latter having a plurality of parallel dough-extruding slots radially therethrough which slope from said hub toward the opposite end of the die and have radial extensions in said hub providing ports connecting the interior of the die with the deeper part of said chamber, means for reciprocating said rods endwise relative to said discharge tube between an outlet closing position, whereat said member closes the outlet, and an outlet opening position whereat said member and part of the length of said die extend from said outlet, and means for supplying dough under pressure to said die during each outlet opening stroke.

References Cited in the file of this patent

UNITED STATES PATENTS

| | | |
|---|---|---|
| 2,262,485 | Belshaw | Nov. 11, 1941 |
| 2,637,282 | Belshaw et al. | May 5, 1953 |
| 2,772,643 | Coyne | Dec. 4, 1956 |
| 2,828,700 | Belshaw | Apr. 1, 1958 |